(12) United States Patent
Cuello et al.

(10) Patent No.: US 11,547,070 B2
(45) Date of Patent: Jan. 10, 2023

(54) VERTICAL-HIVE GREEN BOX CULTIVATION SYSTEMS

(71) Applicant: ARIZONA BOARD OF REGENTS ON BEHALF OF THE UNIVERSITY OF ARIZONA, Tucson, AZ (US)

(72) Inventors: Joel L. Cuello, Tucson, AZ (US); Yaser Mehdipour, Tucson, AZ (US); Cody L. Brown, Tucson, AZ (US); Ryan James Sullivan, Tucson, AZ (US); Richard Jensen Thelander, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 34 days.

(21) Appl. No.: 16/626,175

(22) PCT Filed: Jun. 27, 2018

(86) PCT No.: PCT/US2018/039839
§ 371 (c)(1),
(2) Date: Dec. 23, 2019

(87) PCT Pub. No.: WO2019/006019
PCT Pub. Date: Jan. 3, 2019

(65) Prior Publication Data
US 2020/0154660 A1    May 21, 2020

Related U.S. Application Data

(60) Provisional application No. 62/525,558, filed on Jun. 27, 2017.

(51) Int. Cl.
*A01G 31/06* (2006.01)
*A01G 7/04* (2006.01)
(Continued)

(52) U.S. Cl.
CPC ............ *A01G 31/06* (2013.01); *A01G 7/045* (2013.01); *A01G 9/022* (2013.01); *A01G 31/045* (2013.01)

(58) Field of Classification Search
CPC ...... A01G 31/06; A01G 31/045; A01G 9/022; A01G 9/20; A01G 7/045; A01G 9/025; A01G 31/04
See application file for complete search history.

(56) References Cited

U.S. PATENT DOCUMENTS 4,255,897 A * 3/1981 Ruthner ................. A01G 9/249
                                                    47/65
5,511,340 A * 4/1996 Kertz ..................... H01L 21/285
                                                    47/65

(Continued)

FOREIGN PATENT DOCUMENTS

EP        2644025 A1    10/2013

*Primary Examiner* — Joshua D Huson
*Assistant Examiner* — Megan J Moroney
(74) *Attorney, Agent, or Firm* — Nguyen Tarbet LLC

(57) ABSTRACT

A Vertical-Hive Green Box (or V-Hive Green Box) is a modular cultivation system utilized in a modular Vertical Farm or Plant Factory, as well as a warehouse-type or greenhouse-type of vertical farm or plant factory. The V-Hive Green Box includes growing boards, lighting boards, and an irrigation system arranged within a frame structure to maximize the quantity of crops that can be grown within an available volume of space in a modular Vertical Farm unit, warehouse or greenhouse per unit time. The V-Hive Green Box can also include aquaculture boards that can be used for aquaculture of aquatic fish and plants.

19 Claims, 12 Drawing Sheets

(51) Int. Cl.
*A01G 9/02* (2018.01)
*A01G 31/04* (2006.01)

(56) References Cited

U.S. PATENT DOCUMENTS

| | | | | |
|---|---|---|---|---|
| 5,950,846 | A * | 9/1999 | Duane | A47B 47/022 |
| | | | | 211/175 |
| 6,302,036 | B1 * | 10/2001 | Carson | A47F 1/12 |
| | | | | 108/107 |
| 6,680,200 | B2 * | 1/2004 | Everett | A01G 7/04 |
| | | | | 435/420 |
| 8,151,517 | B2 * | 4/2012 | Emoto | A01G 9/249 |
| | | | | 47/60 |
| 8,151,518 | B2 | 4/2012 | Adams et al. | |
| 8,181,387 | B2 | 5/2012 | Loebl et al. | |
| 8,234,814 | B2 * | 8/2012 | Kertz | A01G 9/024 |
| | | | | 47/67 |
| 8,251,233 | B1 * | 8/2012 | Biglow | A47F 1/12 |
| | | | | 211/59.2 |
| 8,267,261 | B2 * | 9/2012 | Vanderhoek | A01G 9/143 |
| | | | | 211/150 |
| 8,529,092 | B2 * | 9/2013 | Lin | F21S 2/005 |
| | | | | 362/249.06 |
| 8,910,419 | B1 * | 12/2014 | Oberst | A01G 31/06 |
| | | | | 47/60 |
| 9,010,022 | B2 * | 4/2015 | Brusatore | A01G 31/06 |
| | | | | 47/83 |
| 9,374,953 | B2 * | 6/2016 | Martin | A01G 27/008 |
| 9,456,689 | B1 * | 10/2016 | Tinsley | A01G 31/06 |
| 2004/0111965 | A1 * | 6/2004 | Agius | A01G 31/042 |
| | | | | 47/62 R |
| 2009/0277083 | A1 | 11/2009 | Barnes | |
| 2014/0000163 | A1 * | 1/2014 | Lin | A01G 31/02 |
| | | | | 47/62 R |
| 2014/0069002 | A1 * | 3/2014 | Morgan | F21K 9/65 |
| | | | | 47/58.1 LS |
| 2014/0083004 | A1 | 3/2014 | Mackenzie | |
| 2014/0115958 | A1 * | 5/2014 | Helene | A01G 31/06 |
| | | | | 47/17 |
| 2014/0144079 | A1 * | 5/2014 | Lin | A01G 9/249 |
| | | | | 47/62 R |
| 2014/0165468 | A1 * | 6/2014 | Roeser | A01G 13/0237 |
| | | | | 47/62 R |
| 2014/0283452 | A1 * | 9/2014 | Dittman | A01G 31/02 |
| | | | | 47/62 R |
| 2016/0029581 | A1 * | 2/2016 | Martin | A01G 27/008 |
| | | | | 47/62 A |
| 2016/0029582 | A1 * | 2/2016 | Anderson | A01G 31/06 |
| | | | | 47/62 R |
| 2016/0360712 | A1 * | 12/2016 | Yorio | A01G 9/1423 |
| 2017/0055461 | A1 * | 3/2017 | Neuhoff, Jr | A01G 31/06 |
| 2017/0055538 | A1 * | 3/2017 | Ohta | A23L 3/266 |
| 2017/0099791 | A1 * | 4/2017 | Joseph | A01G 31/04 |
| 2017/0354099 | A1 * | 12/2017 | Haughton | A01G 7/045 |
| 2018/0000029 | A1 * | 1/2018 | Martin | A01G 27/008 |
| 2018/0007850 | A1 * | 1/2018 | Dufresne | B65G 1/026 |
| 2018/0014486 | A1 * | 1/2018 | Creechley | H04N 7/183 |

* cited by examiner

VERTICAL-HIVE GREEN BOX CULTIVATION SYSTEMS

CROSS REFERENCE

This application claims priority to U.S. Provisional Application No. 62/525,558, filed Jun. 27, 2017, the specification(s) of which is/are incorporated herein in their entirety by reference.

FIELD OF THE INVENTION

The present invention relates to cultivation systems, in particular, modular cultivation systems featuring a vertical hive (V-Hive) Green Box that can maximize crop productivity within an available volume of space of a growing unit or structure.

BACKGROUND OF THE INVENTION

People all over the world are drawn to living in cities because cities, quite simply, are the world's undisputed economic engine. Just 600 cities today account for about 60 percent of the global economic output. By 2025, the world's top 600 cities will be home to an estimated 220 million more people of working age and will account for more khan 30 percent of the expansion of the potential global workforce. The biggest economic transformation the world has ever seen is occurring today simultaneously with the population expansion of cities in emerging markets, generating millions of new consumers with rising income and whose spending power will change the way the world shops—including people living in cities buying more of their food locally.

The projected rise in today's global population is approximately 7 billion to 9.5 billion by 2050. This projected rise in global population demands an estimated 70 percent increase in food production from current levels by 2050, necessitating a doubling in crop production from 10 billion tons to 20 billion tons by 2050. Given that agriculture already makes use of almost half of the land surface of the planet, consumes over 70 percent of all current freshwater withdrawals worldwide, and expends 30 percent of the global energy demand to food production and its supply chain, it is easy to see that a doubling of crop production will put enormous pressures on land, water and energy resources worldwide, particularly in arid and semiarid regions of the world. Cities, with their infrastructures and centralized planning for supplying water and energy as well as for treating and reusing wastewater and even generating renewable energy, lend themselves to organized and potentially more efficient utilization of water and energy for crop production.

Urban agriculture takes on several forms, including establishing community gardens on vacant lots and, more recently, rooftop greenhouses. Vertical Farming constitutes a third form of urban agriculture. Vertical Farming is generally defined as "the production of crops in vertically stacked growing shelves or trays typically in an enclosed warehouse-type of environment." Vertical Farms typically employ hydroponics technology, or soil-less agriculture, through which crops are grown in liquid nutrient solutions. The crops are also provided either exclusive or supplemental electric lighting using fluorescent lamps or light-emitting diodes (LEDs). Technology improvements achieved over the years, particularly in lighting technology, have improved the production capacity of Vertical Farms.

Due to the association of the concept of Vertical Farms, fairly or unfairly, with grand architectural designs of awe-inspiring and often futuristic-looking edifices, the prospects for Vertical Farms in recent years have been significantly diminished by their projected high costs, particularly on account of the prohibitive costs of the buildings needed to house the actual farms. Thus, to devise a new strategy for designing and developing vertical farms that can achieve economic feasibility, it has been crucial to decouple the concept of vertical farms from conventional buildings to which they became inadvertently intertwined. Vertical Farming may be employed as a highly promising strategy of urban agriculture to help achieve food security in perhaps most of the world's multiplying mega-cities. Vertical Farming may be designed as either low-tech or high-tech; however, it needs to achieve a certain level of sustainability economic, environmental and social—for it to succeed. The following are two crucial strategies that are designed to help Vertical Farming attain economic, social and environmental sustainability.

SANE Test

Each Vertical Farming enterprise must satisfy the SANE Test to achieve economic and social sustainability: S—Safety of Fresh Food, A—Access to Fresh Food, N—Neighborhood Building and Strengthening, and E—Equity Generation and Growth.

S—Safety of Fresh Food:

Vertical farming operations must continuously maintain and preserve their ability to satisfy the all-important demand for safety and quality of fresh produce. For example, a major factor that has been enabling Vertical Farm enterprises to make rapid and successful inroads in China is the series of high-profile food contamination cases that have scandalized China's citizens in recent years, fueling the demand in cities all over China not only for fresh produce, but also for scalable crop production systems that are demonstrably safe.

A—Access to Fresh Food:

Vertical farms in and around cities should not only collapse the distance that fresh crops travel from the farm to the dinner table, which, in the United States for example, is typically from 1,500 miles to within 100 miles, but should also help make possible the elimination of myriads of food deserts, defined as urban areas in which it is difficult to buy affordable, nutritious and good-quality fresh crops owing to the lack of grocery stores, farmers' markets and healthy food providers. Vertical farms should improve access to fresh crops in urban areas in terms of both geographic access and economic access.

N—Neighborhood Building and Strengthening:

Vertical farms should foster community building and strengthening by encouraging community participation and involvement in its production operations, promoting food and environmental education among the community's residents and students, etc. Each Vertical Farm should not only become an integral part of its community, but each Vertical Farm should deliberately make the community it belongs in an integrated ecosystem unto itself—economically, socially and environmentally.

E—Equity Generation and Growth:

Vertical Farms must generate and grow financial equity to its owners, investors, employees and the whole community.

Implementing Cuello's Law (Analog of Moore's Law) to Improve Resource Productivity of Vertical Farms There is a crucial need to propel the Vertical Farming industry into achieving further significant improvements in its resource productivity. With the prodigious pressure on the planet to double crop production by 2050 to meet the enormous food demand of 9.5 billion people then—when today almost half of the planet's land area is already being used for agriculture, two-thirds of the Earth's available fresh water is already being used for food production, and as much as 30 percent of the world's energy expenditure is devoted to agriculture and the food supply chain—producing food with less land, less water, less nutrients, less energy and greater yield has become a pressing global imperative. Fortunately, the ultimate potential of Vertical Farms is that they can produce fresh crops with less land, less water, less nutrients, less energy and greater yields.

Moore's Law is the observation that the number of transistors in a dense integrated circuit doubles approximately every two years. More than a mere observation, Moore's Law also became a projected goal for the semiconductor industry that led to the design of ever more powerful integrated circuits that have made today's electronic and internet technologies possible and ubiquitous. Analogous to Moore's law, Cuello's Law is the projected goal that crop productivity with respect to resource use in a tech-dense indoor farm (including Vertical Farm) should double every four to five years. This means that at least every half a decade in the next 10 years, tech-dense Vertical Farms should achieve a doubling of crop productivity per unit land area, per drop of water, per pound of nutrients and/or per kiloWatt of energy. Cuello's Law simply articulates the great need of which most in the Vertical Farming industry are already keenly aware. Cuello's Law aims to serve as a unifying clarion call and a challenge to the Vertical Farming industry to further innovate and help meet this century's massive food demand while securing resource sustainability.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a Vertical Greenbox Solution as a new paradigm or strategy for designing Vertical Farms to achieve economic feasibility. The Vertical Greenbox Solution, also known as the Non-Building Vertical Farms (NB-VF), pertains to vertical farms constructed without using standard or conventional buildings, but using minimally-structured, modular and prefabricated structures that would be capable of supporting agricultural operations.

Without wishing to limit the invention to a particular theory or mechanism, the Vertical Greenbox Solution paradigm prescribes the following three critical features: (1) Minimally-structured—reduced materials; reduced total weight; reduced load-bearing requirement; reduced plumbing and electrical services; (2) Modular—uniformity of growing space, hardware and environmental control; consistency of operational procedures; interchangeability of units; allows use of varied growing systems; allows development of turn-key operations; and (3) Prefabricated—allows off-site construction and assembly of modules; and significantly lower cost in construction and labor. None of the presently known prior references or work has the unique and inventive technical features of the present invention.

As will be described herein, the present invention features a Vertical-Hive Green Box (or V-Hive Green Box), which is a modular cultivation system that may be used in a modular Vertical Farm or Plant Factory, though it can also be used in a warehouse-type or greenhouse-type of vertical farm or plant factory. The principal design advantage of the V-Hive Green Box is that it maximizes the quantity of crops that can be grown within the available volume of space in a modular unit, warehouse or greenhouse per unit time. In other words, the V-Hive Green Box maximizes crop productivity within the available volume of space of the growing unit or structure.

In preferred aspects, the principal structural components of the V-Hive Green Box include a frame, a growing board (G-board) with cultivation trays/tubes, and a lighting board (L-board) with the light sources, such as light tubes or lamps. The V-hive Green Box may further include an aquaculture board (A-board) configured for use in aquaponics. The dimensions of the V-Hive Green Box may be adjusted to fit an available volume of space in a Vertical Farm or Plant Factory modular unit, which may be a shipping container, thereby maximizing crop productivity within the available volume of space in the Vertical Farm or Plant Factory modular unit.

As will be described herein, at least three types of V-Hive Green Boxes, namely, a V-Hive Crop Green Box, a V-Hive Aquaponics Green Box, and a V-Hive Aquaculture Green Box. The V-Hive Crop Green Box may include G-Boards and L-Boards. The V-Hive Aquaponics Green Box may combine hydroponics and aquaculture (or fish culture) and, thus, includes G-Boards, L-Boards and A-Boards. Lastly, the V-Hive Aquaculture Green Box only makes use of the A-Boards.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Other technical advantages may become readily apparent to one of ordinary skill in the art after review of the following figures and description.

BRIEF DESCRIPTION OF THE DRAWINGS

The features and advantages of the present invention will become apparent from a consideration of the following detailed description presented in connection with the accompanying drawings in which.

DESCRIPTION OF PREFERRED EMBODIMENTS

Figure 1A:
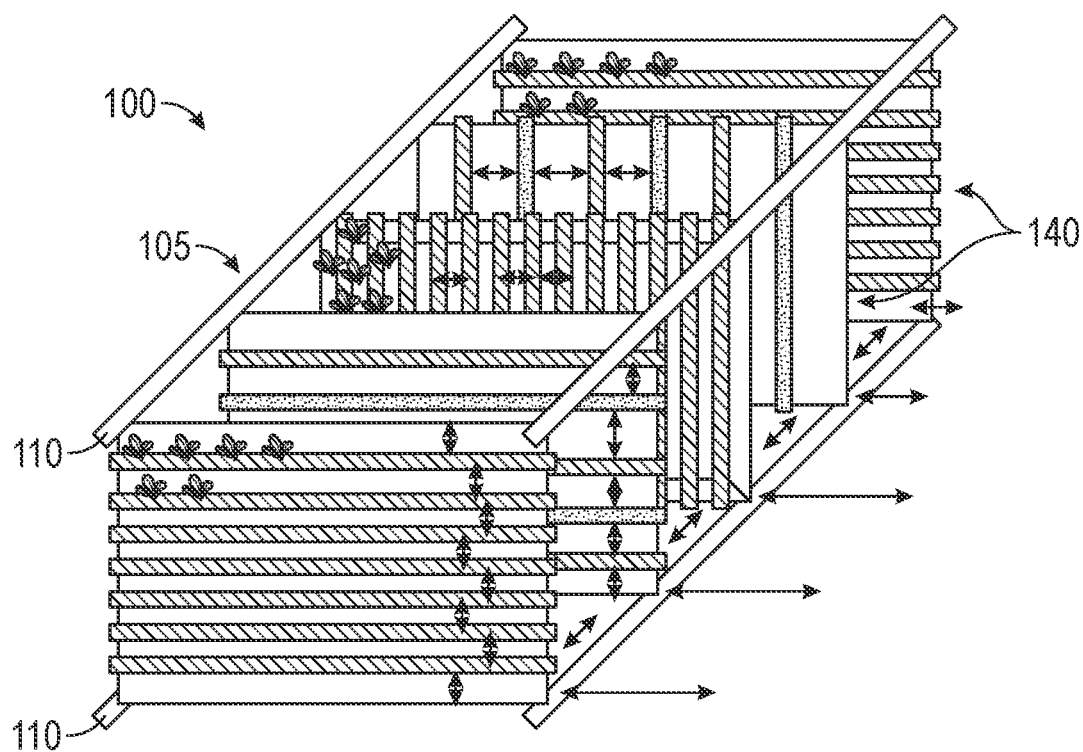
FIG. 1A shows a mixed horizontal-vertical embodiment of a vertical-hive (V-hive) green box cultivation system of the present invention. "Mixed" pertains to the combined horizontal and vertical orientations of the growing trays/tubes and light sources used.

Following is a list of elements corresponding to a particular element referred to herein:
100 modular cultivation system
105 vertical hive (V-Hive) green box
110 frame structure
111 top frame
112 top rails
115 bottom frame
116 bottom rails
118 side frame
120 lop tracks
122 first top track end
124 second top track end
130 bottom tracks
132 first bottom track end
134 second bottom track end
136 extension track
140 cultivation boards
142 growing boards
144 growing trays
145 growing space
146 lighting boards
148 light sources
149 light spacing
150 aquaculture boards
152 rigid tank
154 air sparger
160 sliding mechanism
170 reservoir
172 reflective panel
174 pump
176 tubing
178 discharge hose Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components. As used in this document, "each" refers to each member of a set or each member of a subset of a set.

Figure 1B:
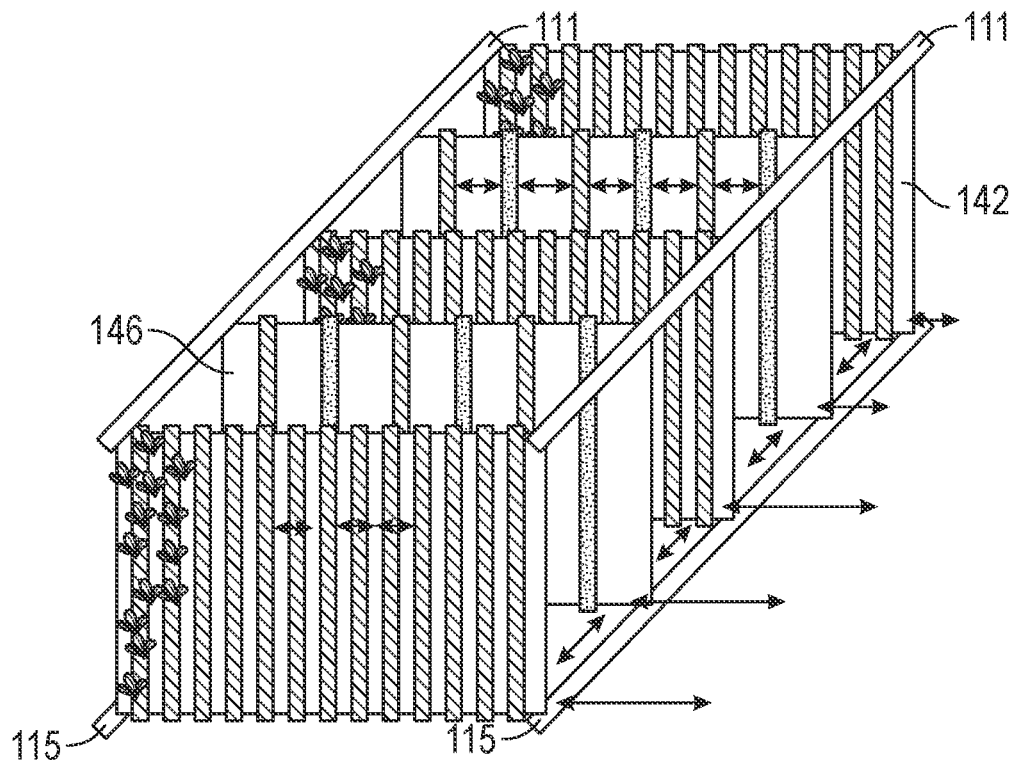
FIG. 1B is a vertical embodiment of the V-hive green box cultivation system. "Vertical" pertains to the vertical orientation of the growing trays/tubes and light sources.
Figure 1C:
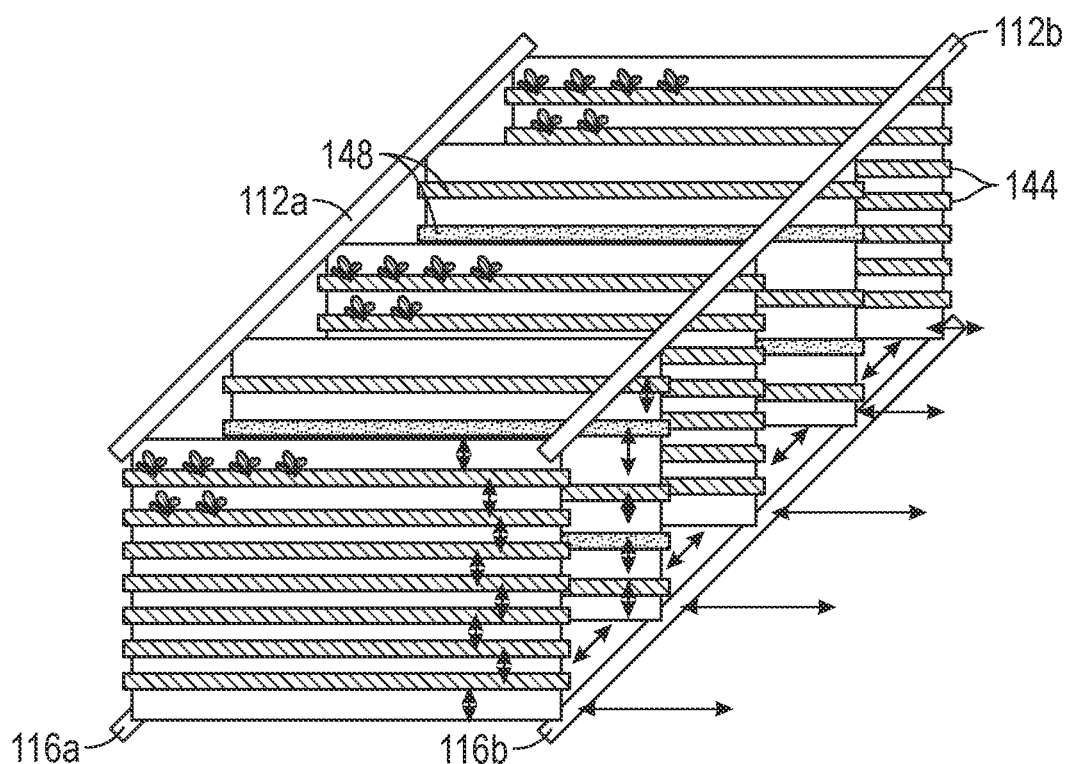
FIG. 1C shows a horizontal embodiment of the V-hive green box cultivation system. "Horizontal" pertains to the horizontal orientation of the growing trays/tubes and light sources.

Referring now to FIG. 1A-1C, in one embodiment, the present invention features modular cultivation system (100) comprising a vertical hive (V-Hive) green box (105). In some embodiments, the V-Hive green box (105) may comprise a frame structure (110) comprising a top frame (111) having two parallel top rails (112a, 112b), and a bottom frame (115) having two parallel bottom rails (116a, 116b). In one embodiment, the top rails (112a, 112b) are parallel to the bottom rails (116a, 116b). In another embodiment, the frame structure (110) may further comprise a side frame (118) connecting the top frame (111) to the bottom frame (115). For example, the frame structure (110) may be a box frame structure. In further embodiments, the frame structure (110) may comprise substantially transparent or non-transparent panels for covering the frame structure.

In some embodiments, a plurality of top tracks (120) may be connected to the top frame of the frame structure. Each top track (120) can have a first top track end (122) connected to one of the top rails (112a) and a second top track end (124) connected to the other top rail (112b) such that each top track (120) is perpendicular to the top rails. Preferably, the top tracks are parallel to each other. In other embodiments, a plurality of bottom tracks (130) may be connected to the bottom frame of the frame structure. Each bottom track (130) can have a first bottom track end (132) connected to one of the bottom rails (116a) and a second bottom track end (134) connected to the other bottom rail (116b) such that each bottom track (130) is perpendicular to the bottom rails. Preferably, the bottom tracks are also parallel to each other. Further still, each bottom track may be positioned on the bottom rails and each top track may be positioned on the top rails such that each bottom track has a corresponding top track that is parallel to and directly opposite of said bottom track.

In some embodiments, the V-hive green box may include a plurality of cultivation boards (140). Each cultivation board (140) can be a growing board (142), a lighting board (146), or an aquaculture board (150). Each cultivation board (140) may be disposed between one of the bottom tracks and its corresponding top track. Preferably, each cultivation board (140) is slidably movable along the top and bottom tracks (120, 130) in a first direction orthogonal to the top and bottom rails (112, 116). Further still, the top and bottom tracks (120, 130) may also be slidably movable along the top and bottom rails (112, 116) in a second direction parallel to the top and bottom rails, thereby allowing for movement of the cultivation boards (140) in the second direction. The arrows in FIGS. 1A-1C indicate the direction of the sliding movement. For instance, the horizontal arrows shows the sliding movement along the top and bottom tracks in the first direction orthogonal (i.e. frontal) to the top and bottom rails. The arrows that are parallel to the rails shows the sliding movement of the top and bottom tracks along the top and bottom rails in the second direction parallel (i.e. lateral) to the top and bottom rails.

Figure 2:
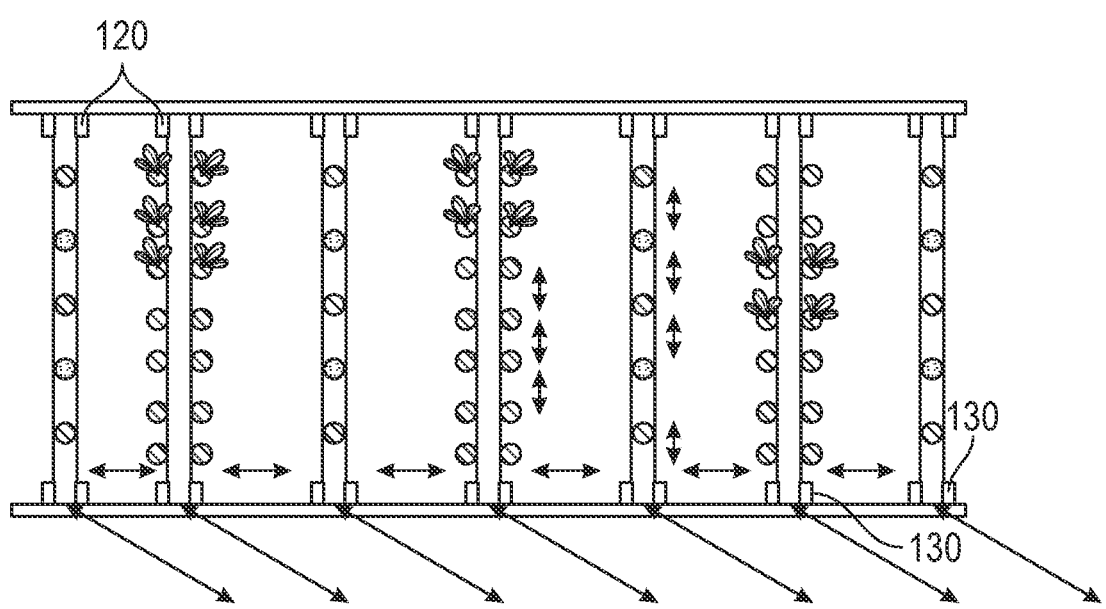
FIG. 2 shows a front view of the V-hive green box cultivation system of FIG. 1C.

In some embodiments, the cultivation boards (140) include a plurality of growing boards (142). Preferably, each growing board is configured to fit and slidably insert between one of the bottom tracks and its corresponding top track. In another embodiment, the cultivation boards (140) include a plurality of lighting boards (146). Each lighting board may be configured to fit and slidably insert between one of the bottom tracks and its corresponding top track. As shown in FIG. 2, the growing boards and the lighting boards can be slidably movable along the top and bottom tracks in a first direction orthogonal (i.e. frontal) to the top and bottom rails. In other preferred embodiments, the top and bottom tracks may be configured to slidably move along the top and bottom rails in a second direction parallel (i.e. lateral) to the top and bottom rails, thereby allowing for movement of the growing boards and the lighting boards in the second direction.

Figure 3B:
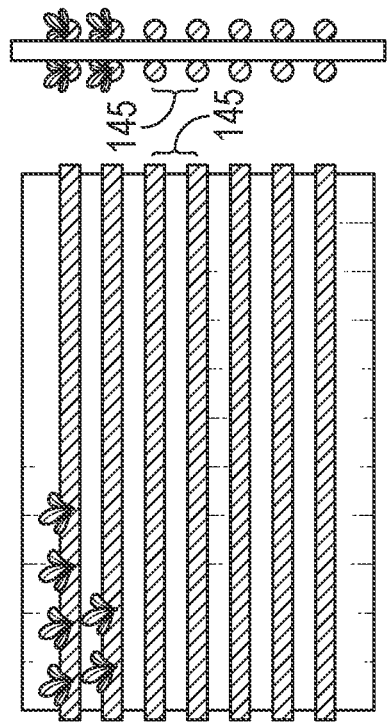
FIG. 3B shows front and side views of an alternative embodiment of the G-Board. The G-Board can have growing trays disposed in a horizontal configuration.
Figure 3A:
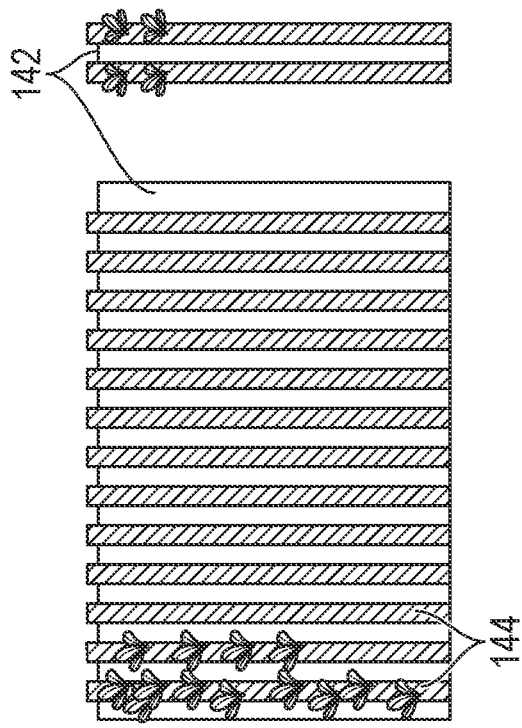
FIG. 3A shows front and side views of a growing board (G-Board) of the V-hive green box cultivation system. The G-Board can have growing trays disposed in a vertical configuration.

Referring to FIG. 3A-3B, in some embodiments, each growing board may comprise a plurality of growing trays (144) attached to said growing board (142). Preferably, the growing trays (144) are configured for containing and growing crops. For instance, the crop production mode may be hydroponics, aeroponics, soil-based, or a combination thereof. In one embodiment, as shown in FIG. 3A, the growing trays (144) may be oriented vertically on the growing board (142). In another embodiment, as shown in FIG. 3B, the growing trays (144) may be oriented horizontally on the growing board (142). In another embodiment, the growing trays (144) may be disposed parallel to each other. In preferred embodiments, a growing space (145) formed between two adjacent growing trays (144) of the growing board may be adjusted. For instance, the growing trays/tubes (144) can be slidable or movable along the same growing board. The growing space (145) may be determined based on a height and other morphological features of the specific crop being grown for optimization of physical spacing and incident lighting. Various mechanisms may be employed to implement the movement of the growing trays/tubes on the growing board. This includes, for instance, the use of compressible or expandable sections or members between adjacent growing trays/tubes. The direction of movement of the growing trays/tubes is indicated by the vertical and horizontal arrows shown on the growing boards in FIGS. 1A-1C.

In some embodiments, the growing board (142) may comprise one or more panels, a skeletal growing frame, or a combination thereof. The panel may be substantially transparent or non-transparent. In one embodiment, the growing board (142) may comprise a single solid, continuous panel. In another embodiment, the growing board (142) may be non-solid and discontinuous when comprised of a plurality of panels. In some embodiments, the growing trays (144) may be tubular, rectangular or of any geometric configuration. In other embodiments, the growing trays (144) may be disposed on either side, or both sides, or right in the middle of the growing board.

Figure 4B:
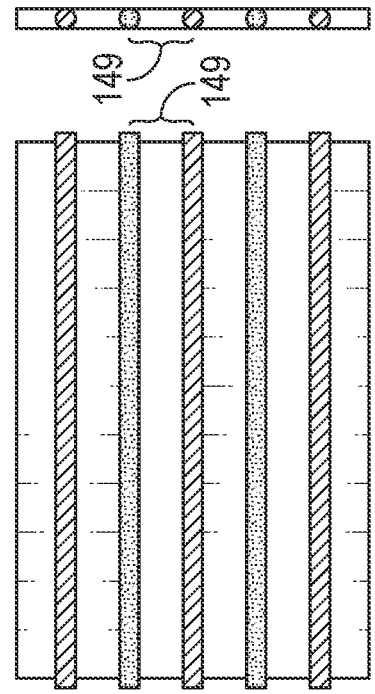
FIG. 4B shows front and side views of an alternative embodiment of the L-Board. The L-Board can have light sources disposed in a horizontal configuration.
Figure 4A:
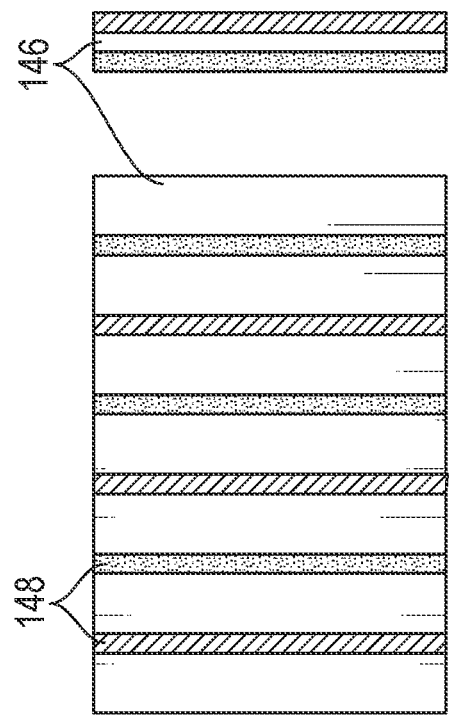
FIG. 4A shows front and side views of a lighting board (L-Board) of the V-hive green box cultivation system. The L-Board can have light sources disposed in a vertical configuration.

Referring to FIG. 4A-4B, in some embodiments, each lighting board (146) may comprise a plurality of light sources (148) attached to said lighting board (146) and configured to provide lighting to the crops. In one embodiment, as shown in FIG. 4A, the light sources (148) may be oriented vertically on the lighting board (146). In another embodiment, as shown in FIG. 4B, the light sources (148) may be oriented horizontally on the lighting board (146). In yet another embodiments, the light sources (148) may be disposed parallel to each other. Examples of the light sources (148) include but are not limited to, light emitting diodes (LEDs), fluorescent tubes, or a combination thereof. Preferably, a light spacing (149) formed between two adjacent light sources of the lighting board may be adjustable to allow for optimal lighting of the crops. For instance, the light sources (148) can be slidable or movable along the lighting board (146). The lighting space (149) may be determined based on the height and other morphological features of the specific crop being grown for optimization of incident lighting. Various mechanisms may be employed to implement the movement of the light sources on the lighting board. This includes, for instance, the use of compressible or expandable sections or members between adjacent light sources. The direction of movement of the light sources is indicated by the vertical and horizontal arrows shown on the lighting boards in FIGS. 1A-1C.

In some embodiments, the lighting board (146) may comprise one or more panels, a skeletal lighting frame, or a combination thereof. The panel may be substantially transparent or non-transparent. In one embodiment, the lighting board (146) may comprise a single solid, continuous panel. In another embodiment, the lighting board (146) may be non-solid and discontinuous when comprised of a plurality of panels. In some embodiments, the light sources (148) may be disposed on either side, or both sides, or right in the middle of the lighting board.

Figure 5:
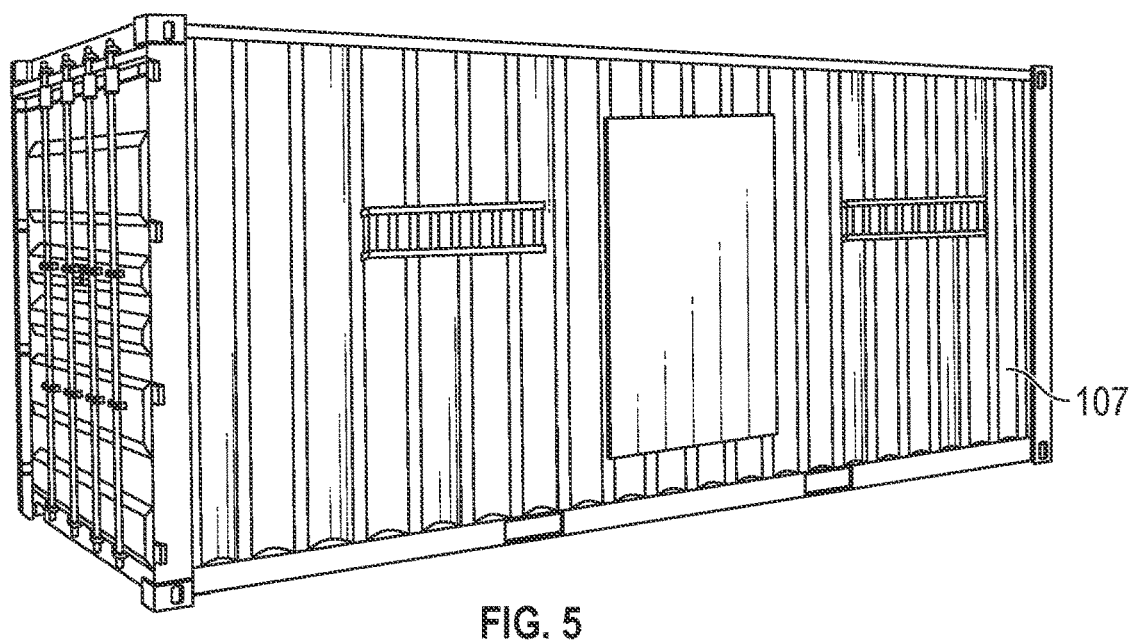
FIG. 5 shows a shipping container repurposed as a modular unit for Vertical Farming.
Figure 6:
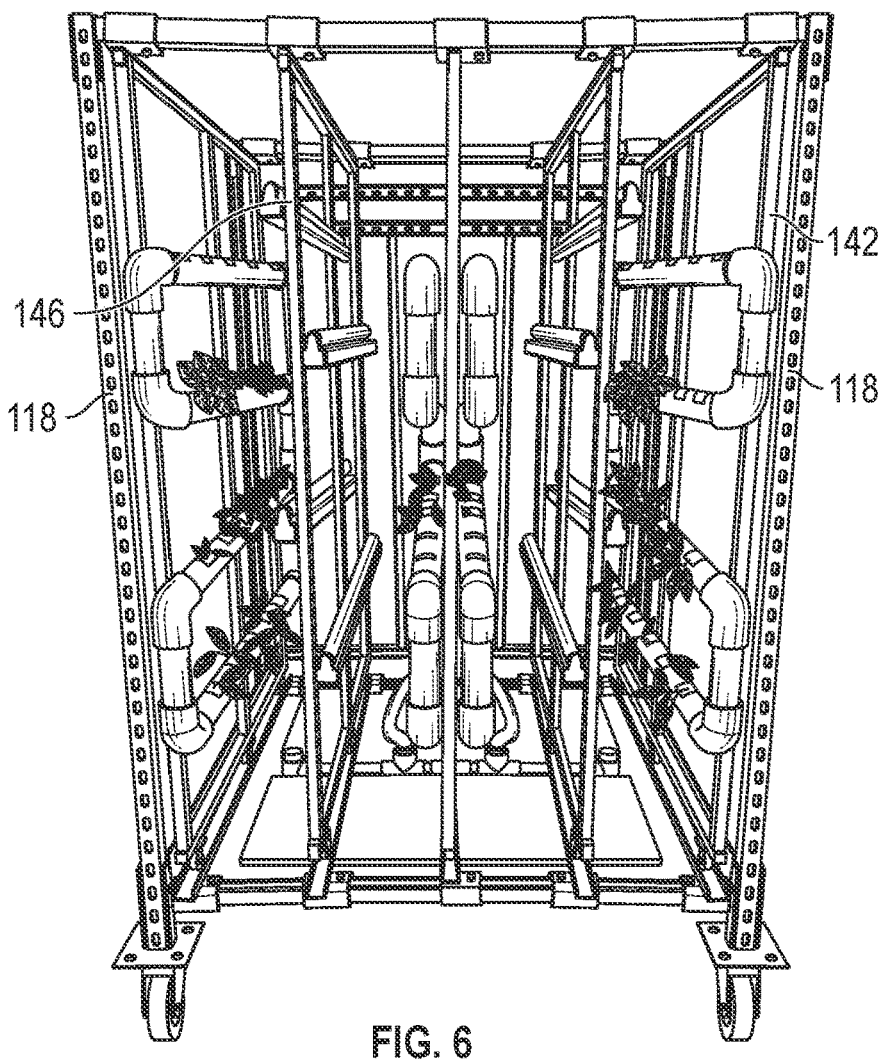
FIG. 6 shows a prototype of the V-Hive Green Box inside the repurposed shipping container.
Figure 7:
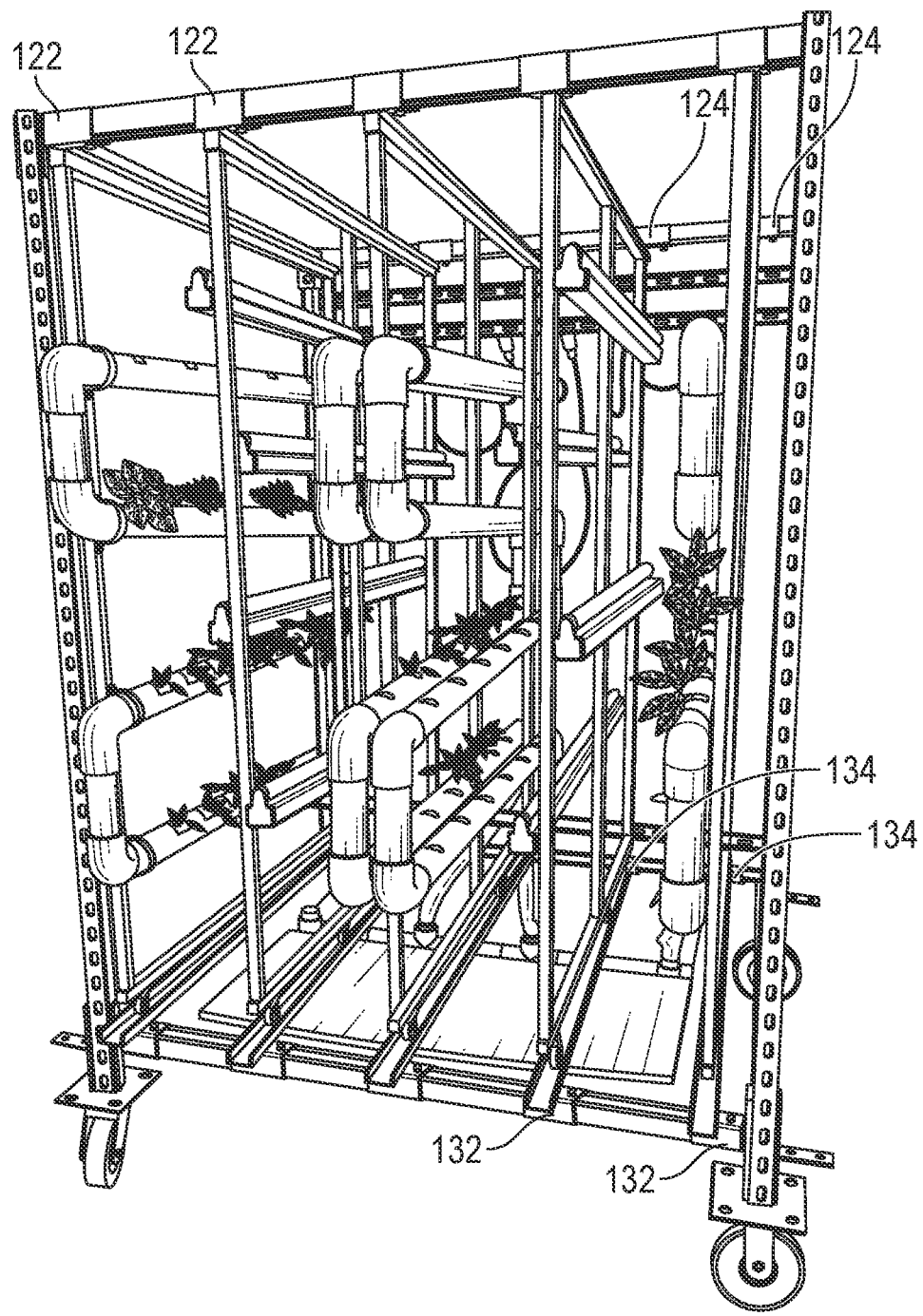
FIG. 7 shows the V-Hive Green Box prototype with its structural components, including a frame, G-Board with cultivation trays/tubes, and L-Board with light tubes or lamps.

As shown in FIG. 5, the system may further comprise an exterior casing (107) for housing the V-hive green box. For example, the exterior casing (107) may be a standardized modular unit, such as a shipping container. The shipping container qualifies as a pre-existing example of such modular unit that can be repurposed for Vertical Farming. FIGS. 6 and 7 show an example of the V-hive green box (105) comprised of its principal structural components, including the frame, growing board (G-Board) with cultivation trays/tubes, and lighting board (L-Board) with light tubes or lamps, and disposed in a repurposed shipping container.

In some embodiments, the modular units can be stacked vertically and arranged in a number of geometric configurations to achieve optimal use of land area and also to optimize growing operations, which could include the use of elevators to move growers to gain access to the individual modules. The possible geometric configurations for the Vertical Farm include, but are not limited to: (1) cylindrical configurations, where columns of the vertically stacked modules linked end-to-end radiate outwardly from a central core; or (2) linear configurations, where columns of the vertically stacked modules linked end-to-end are arranged in parallel.

Figure 8A:
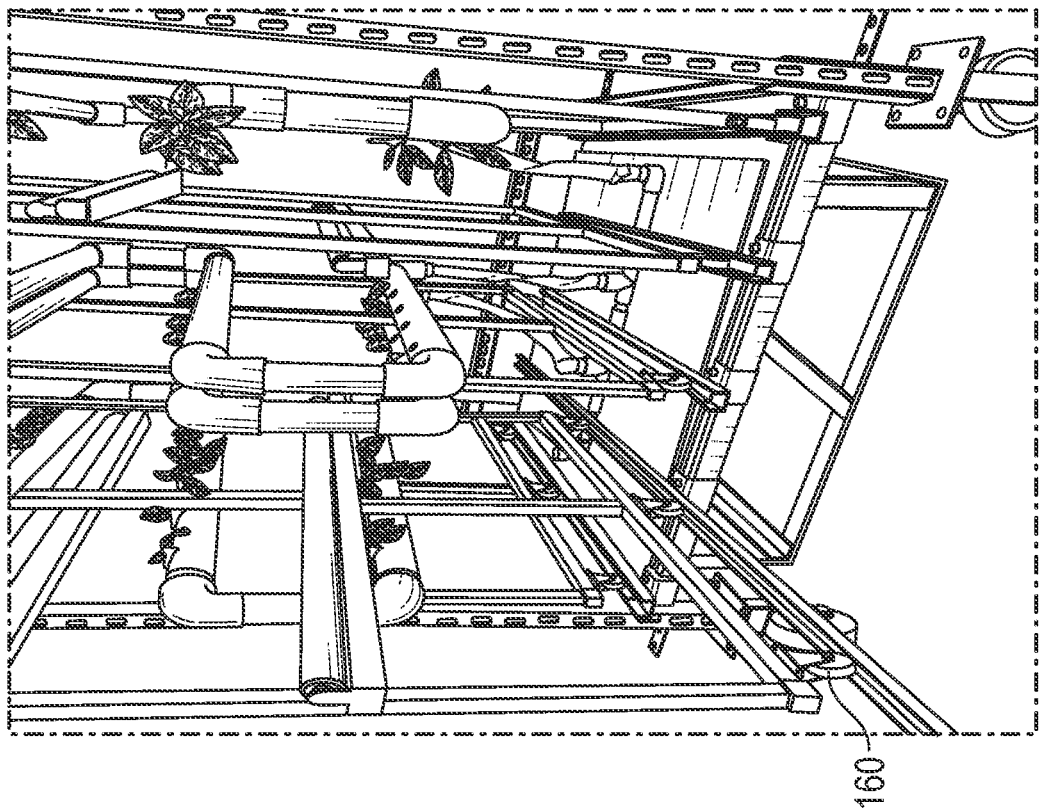
FIG. 8A demonstrates a sliding movement of the G-Board for convenient access of the crops by the grower for planting, maintenance and harvest.
Figure 8B:
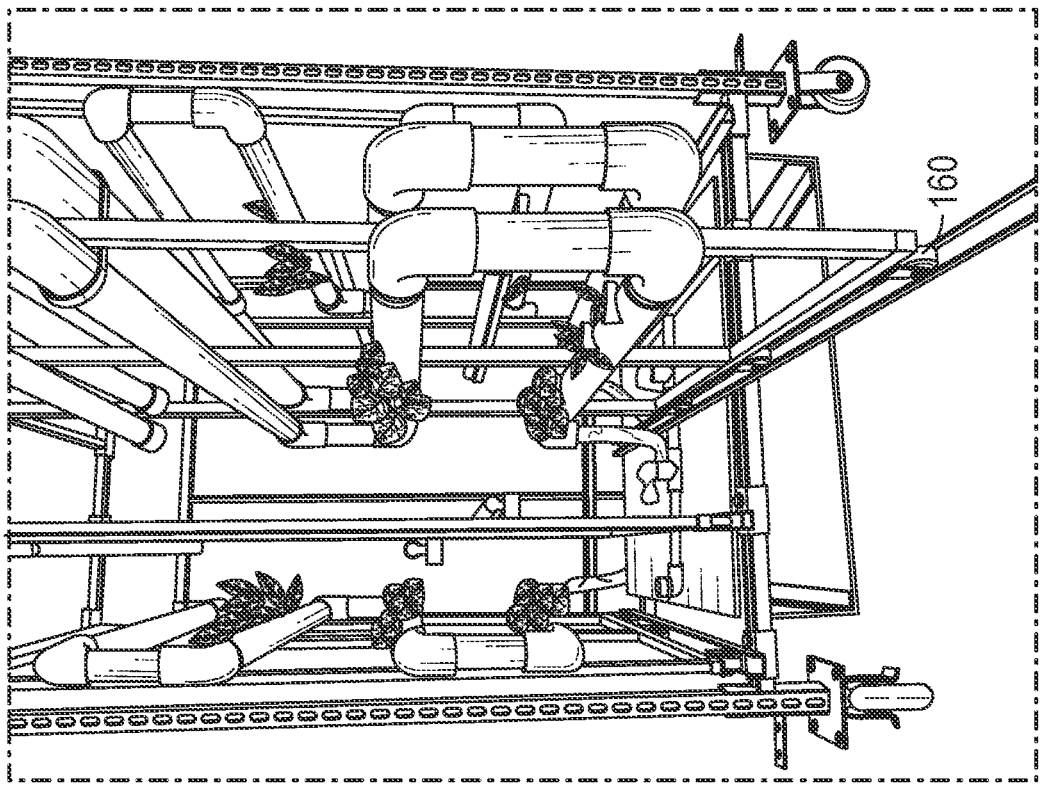
FIG. 8B demonstrates the sliding movement of the L-Board for convenient access of the lamps by the grower for installation and maintenance.

Referring to FIG. 8A, in preferred embodiments, each growing board (142) may further comprise a sliding mechanism (160) disposed thereon and configured to slide along the top and bottom tracks (120, 130), thereby allowing for the cultivation board (140) to slidably move in the first direction. For example, the sliding mechanism (160) may be disposed on the top and bottom edges of the growing board that engage with the top and bottom rails. Referring to FIG. 8B, in other preferred embodiments, each lighting board (146) may further comprise a sliding mechanism (160) disposed thereon and configured to slide along the top and bottom tracks (120, 130), thereby allowing for the lighting board (146) to slidably move in the first direction. The sliding mechanism (160) may be disposed on the top and bottom edges of the lighting board that engage with the top and bottom rails. Non-limiting examples of the sliding mechanism (160) include wheels, ball bearings, or sliding brackets. Without wishing to limit the invention to a particular theory or mechanism, the orthogonal movement (e.g. frontal or sliding along the top and bottom tracks) of the growing board allows for convenient access of the crops by the grower for planting, maintenance and harvest. Similarly, the orthogonal movement of the lighting board allow for convenient access of the lamps by the grower for installation and maintenance.

Figure 9:
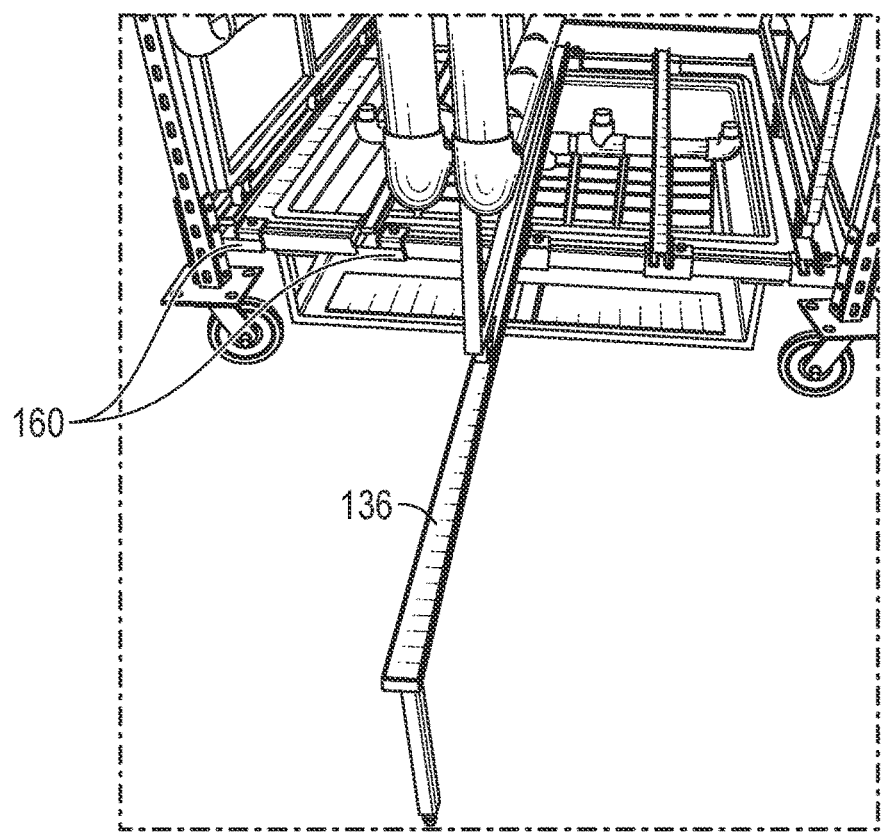
FIG. 9 shows a removable extension track to implement the sliding movement of the G-Board, as well as the L-Board.

In further embodiments, as shown in FIG. 9, each bottom track (130) may further comprise a removable extension track (136) configured to be connected to the bottom track (130). Without wishing to limit the invention to a particular theory or mechanism, the extension track (136) can allow for the cultivation boards (140) to slidably move beyond the frame structure (110).

Figure 11:
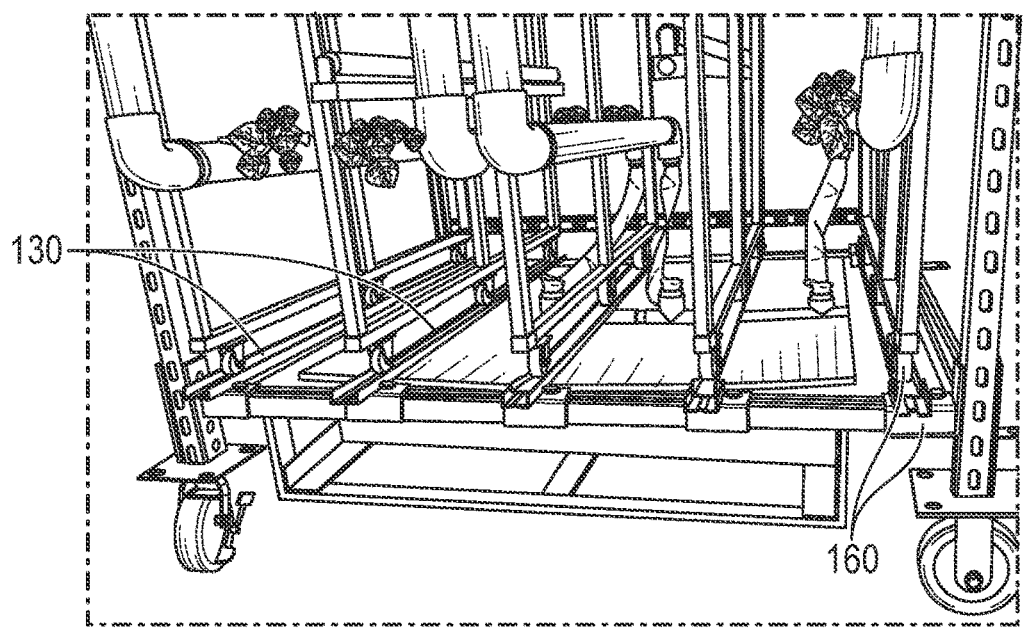
FIG. 11 shows a frame track on which the G-Board and/or L-Board is slidably movable in a direction parallel to the frame track.

As shown in FIGS. 11A-11B, in other preferred embodiments, a sliding mechanism (160) may be disposed on each of the top track ends (122, 124) and each of the bottom track ends (132, 134). Non-limiting examples of the sliding mechanism include wheels, ball bearings, or sliding brackets. Without wishing to limit the invention to a particular theory or mechanism, the sliding mechanism (160) can allow for the top and bottom tracks to slidably move along the top and bottom rails, respectively, in the second direction (e.g. lateral), thereby enabling movement of the cultivation boards (140) in the second direction. This can further allow for the adjustment of a distance between the crops and the light sources to achieve optimal lighting of the crops.

Figure 12:
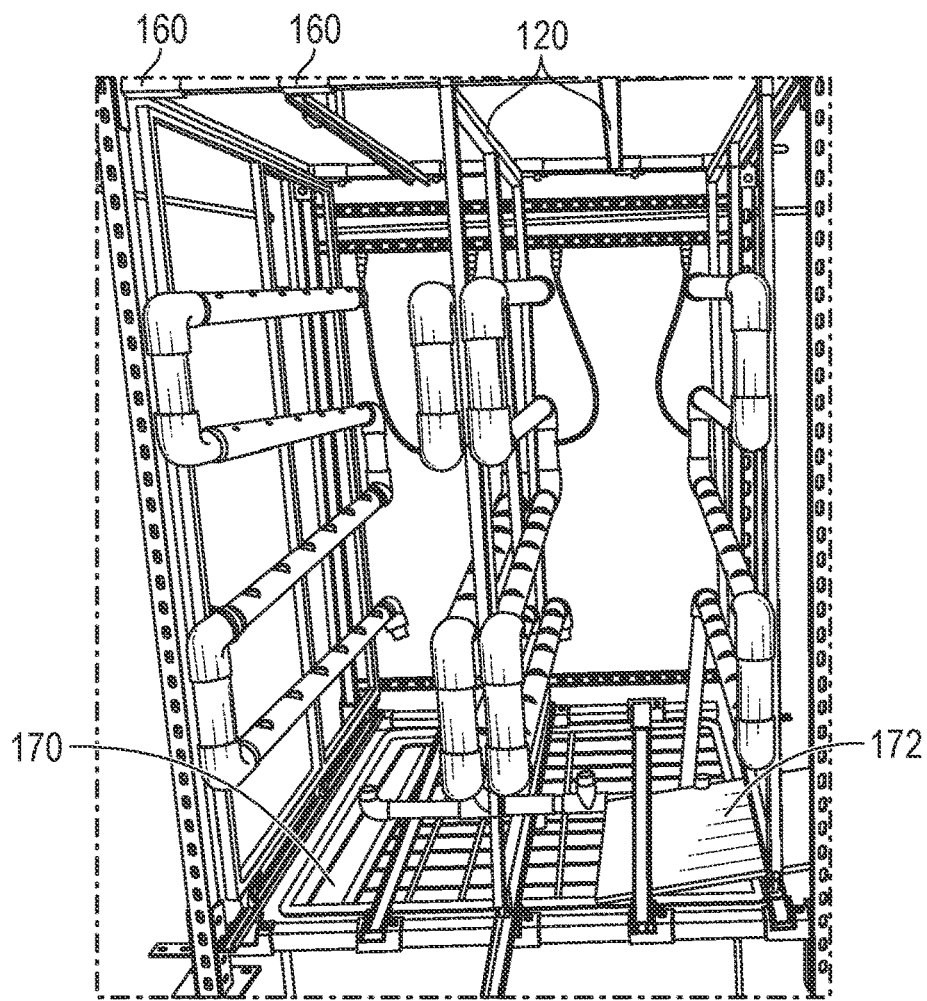
FIG. 12 shows a liquid nutrient solution reservoir located at the bottom of the V-Hive Green Box, which may be covered with reflective panels.

Referring to FIGS. 12A-12B, in some embodiments, the V-hive green box (105) may further comprise a reservoir (170) for storing liquid nutrients. In other embodiments, the reservoir (170) may further include a panel, such as a reflective panel (172), for covering the reservoir (170) during operation. The panel (172) may be removed to access the reservoir (170). In one embodiment, the reservoir (170) may be disposed at or near the bottom frame. For example, as shown in FIG. 12B, the reservoir (170) is directly below the bottom frame, i.e. at the base of the V-hive green box.

Figure 13B:
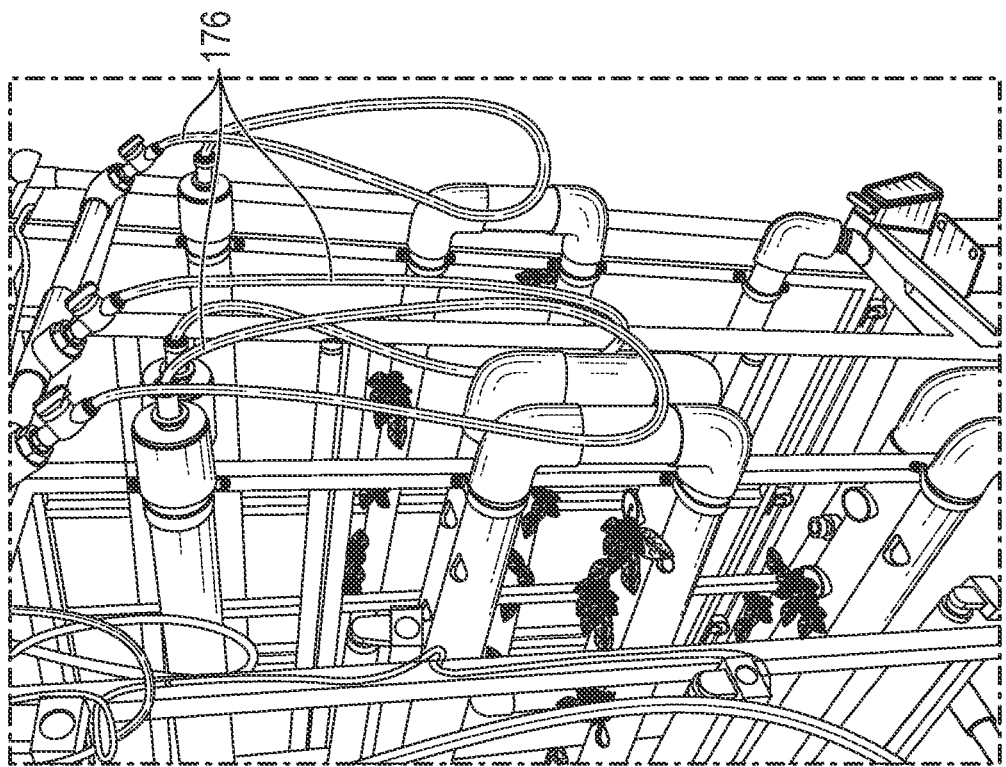
FIG. 13B shows the liquid nutrient solution pumped from the reservoir and distributed into the growing tubes in the V-Hive Green Box.
Figure 13A:
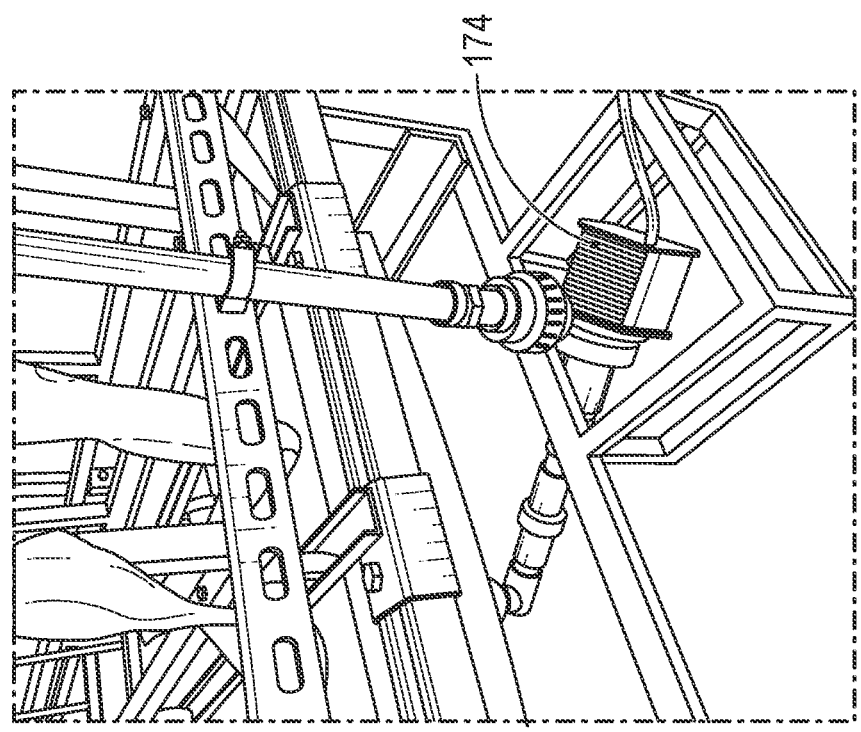
FIG. 13A shows a centrifugal pump used to convey the liquid nutrient solution from the reservoir to the growing tubes in the V-Hive Green Box.
Figure 14A:
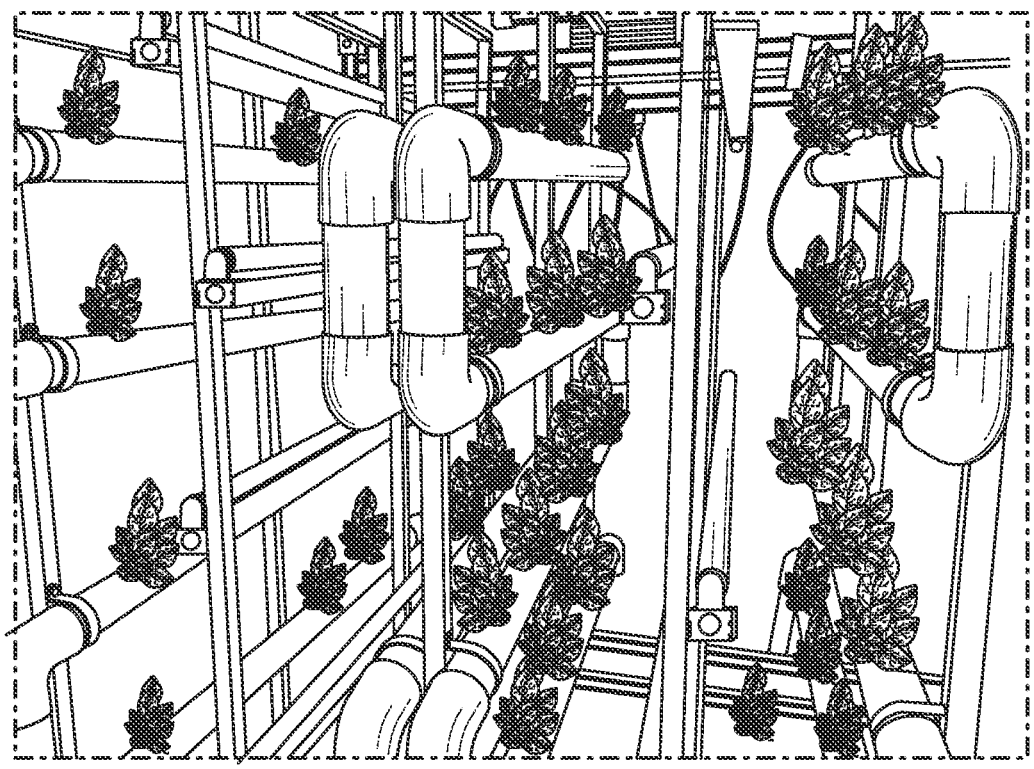
FIG. 14A-14B shows non-limiting examples of crop production using the cultivation system of the present invention.
Figure 14B:
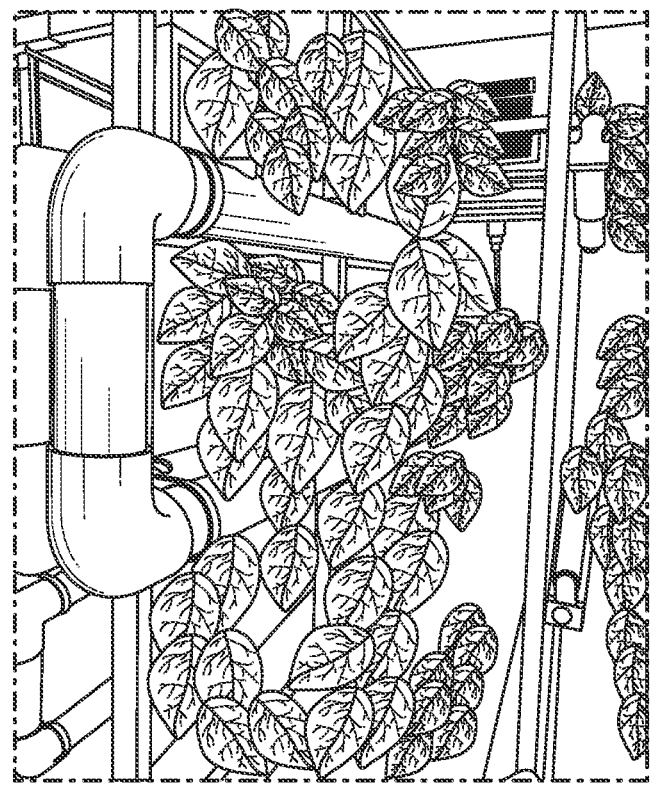

As shown in FIGS. 13A-13C, in further embodiments, the V-hive green box (105) may further comprise a pump (174), and tubing (176) for connecting the pump (174) to the growing boards (144). The pump (174) can pump the liquid nutrients from the reservoir (170) to the growing boards (144). For instance, the pump (174) may be fluidly connected to a manifold having a plurality of tubing channels (176), and each tubing channel (176) may be fluidly connected to a growing tray. A connection between the manifold and each fluid channel may comprise a valve for controlling the flow rate of fluids to the growing trays. The tubing (176) may be polymer tubing, preferably transparent tubing to allow for visual inspection of the channels.

In an exemplary embodiment, when the growing trays (144) are oriented horizontally, the tubing channels may be connected to the top-most growing tray (144). The top-most growing tray may be fluidly coupled to a second top-most growing tray, the second top-most growing tray may be fluidly coupled to a lower growing tray, and so forth. In this configuration, the fluids can be introduced to the top-most growing tray, instead of each growing tray, and the fluids can be recycled and gravity fed from the upper growing trays to the lower growing trays.

Figure 10:
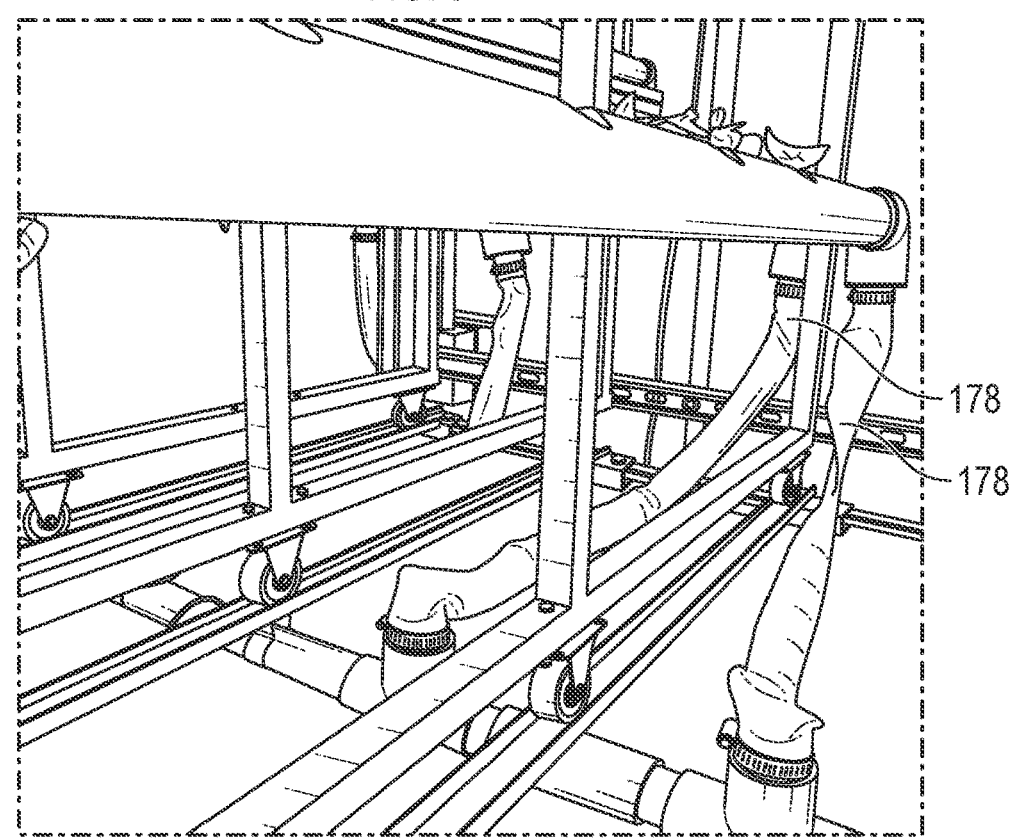
FIG. 10 shows how the sliding movement of the G-Board is enabled by the use of flexible PVC flat discharge hoses for conveying a flowing liquid nutrient solution through the growing tubes.

In other embodiments, as shown in FIG. 10, the growing boards (142) may be fluidly connected to the reservoir (170) for recycling the liquid nutrients. For example, the lower-most growing tray (144) of each growing board may be connected to the reservoir (170) via a flexible discharge hose (178). Without wishing to limit the invention to a particular theory or mechanism, the flexible discharge hose (178) enables movement of the growing board in the first or second direction while maintaining connection of the growing board (142) to the reservoir (170) for discharging the liquid nutrients.

Figure 15A:
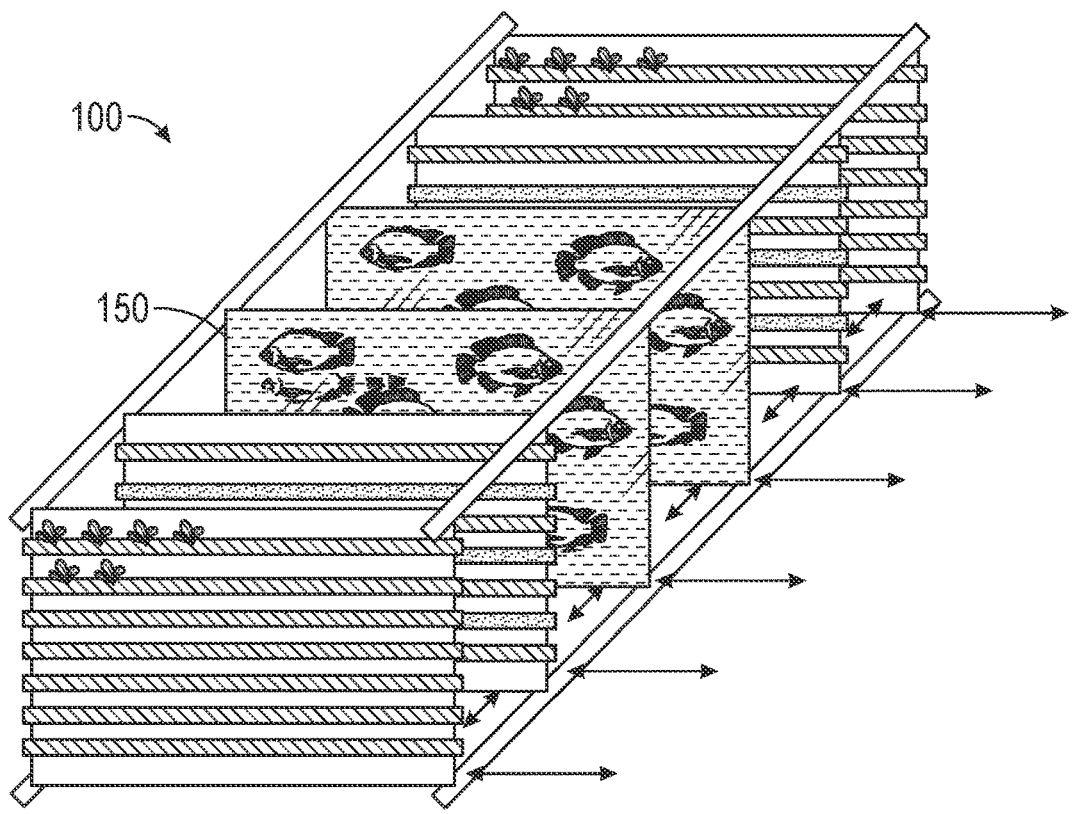
FIG. 15A shows an embodiment of a V-hive Aquaponics Green Box cultivation system having a combination of growing boards, lighting boards, and aquaculture boards (A-boards).

Referring to FIG. 15A, in some embodiments, the V-hive green box (105) may further comprise one or more aquaculture boards (150). Each aquaculture board (150) may comprise a rigid tank (152) configured to hold fluids. Preferably, the aquaculture boards (150) are configured for raising aquatic animals, aquatic plants, or a combination thereof. In one embodiment, each aquaculture board (150) may be disposed between one of the bottom tracks and its corresponding top track. The aquaculture boards (150) can be slidably movable along the top and bottom tracks (120, 130) in the first direction. Further still, movement of the top and bottom tracks along the top and bottom rails in the second direction enables movement of the aquaculture boards (150) in the second direction.

In another embodiment, each aquaculture board (150) may further comprise a sliding mechanism (160) disposed thereon and configured to slide along the top and bottom tracks (120, 130), thereby allowing for the aquaculture board (150) to slidably move in the first direction. A removable extension track (136) can be connected to the bottom track of the aquaculture board to allow for the aquaculture board (150) to slidably move beyond the frame structure (110).

In some embodiments, the rigid tank (152) of each aquaculture board may be constructed from a substantially transparent or non-transparent rigid material. Examples of the rigid material include, but are not limited to, glass, polyvinyl chloride, polyethylene, or polycarbonate material. Preferably, the rigid tank (152) is sealed and capable of holding fluids such as water, salt water, or any fluid environment in which the aquatic animals or plants can be cultivated. In other embodiments, the aquaculture board (150) may further comprise one or more air spargers (154) operatively connected to the rigid tank (152) for aerating the water.

In one embodiment, as shown in FIGS. 1A-1C, the growing boards (142) and the lighting boards (146) may be arranged within the frame structure (110) in an alternating pattern such that each growing board is disposed between two lighting boards. Alternatively, the growing boards (142) and the lighting boards (146) may be arranged in a pattern where at least two growing boards (142) are positioned between two lighting boards (146). In another alternative embodiment, as shown in FIG. 15A, one lighting board (146) may be disposed between one growing board (142) and one aquaculture board (150), thereby providing lighting to both the growing board and the aquaculture board. Preferably, the lighting board is disposed between the growing boards, the aquaculture boards, or a combination thereof provided that at least one side or face of the growing board or the aquaculture board is exposed to incident lighting.

Figure 15B:
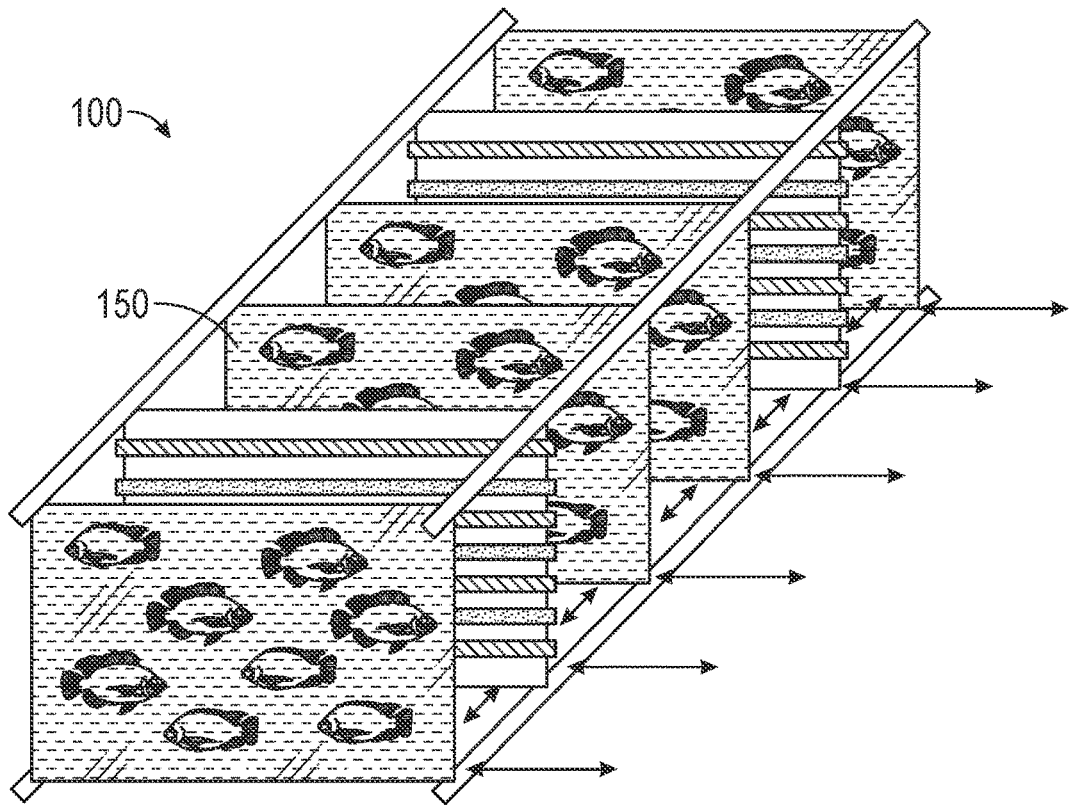
FIG. 15B shows an embodiment of a V-hive Aquaponics Green Box cultivation system having a combination of lighting boards and aquaculture boards (A-boards).
Figure 15C:
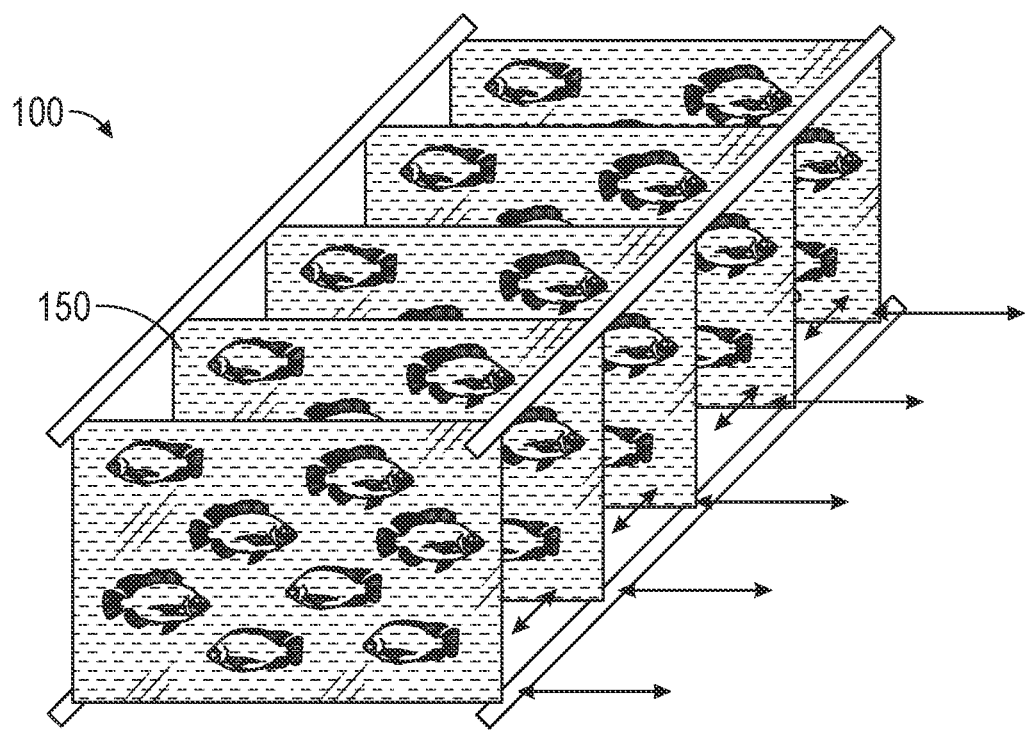
FIG. 15C shows an alternative embodiment of the V-hive Aquaponics Green Box cultivation system having aquaculture boards.

Referring to FIG. 15C, according to another embodiment, the present invention features a modular cultivation system (100) comprising a vertical hive (V-Hive) aquaponics green box (105) comprising a frame structure (110) comprising a top frame (111) having two parallel top rails (112a, 112b), and a bottom frame (115) having two parallel bottom rails (116a, 116b) that are parallel to the top rails (112a, 112h). The V-Hive aquaponics green box (105) also includes a plurality of top tracks (120), each top track (120) having a first top track end (122) connected to one of the top rails (112a) and a second top track end (124) connected to the other top rail (112b) such that each top track (120) is perpendicular to the top rails and parallel to each other, and a plurality of bottom tracks (130), each bottom track (130) having a first bottom track end (132) connected to one of the bottom rails (116a) and a second bottom track end (134) connected to the other bottom rail (116b) such that each bottom track (130) is perpendicular to the bottom rails and parallel to each other. Preferably, each bottom track (130) can have a corresponding top track (120) that is parallel to and directly opposite of said bottom track (130). A plurality of aquaculture boards (150), configured for raising aquatic animals, aquatic plants, or a combination thereof, may each be disposed between one of the bottom tracks and its corresponding top track. The aquaculture boards (150) can be slidably movable along the top and bottom tracks (120, 130) in a first direction orthogonal to the top and bottom rails (112, 116). The top and bottom tracks (120, 130) can also be slidably movable along the top and bottom rails (112, 116) in a second direction parallel to the top and bottom rails, thereby allowing for movement of the aquaculture boards (150) and in the second direction.

Figure 16:
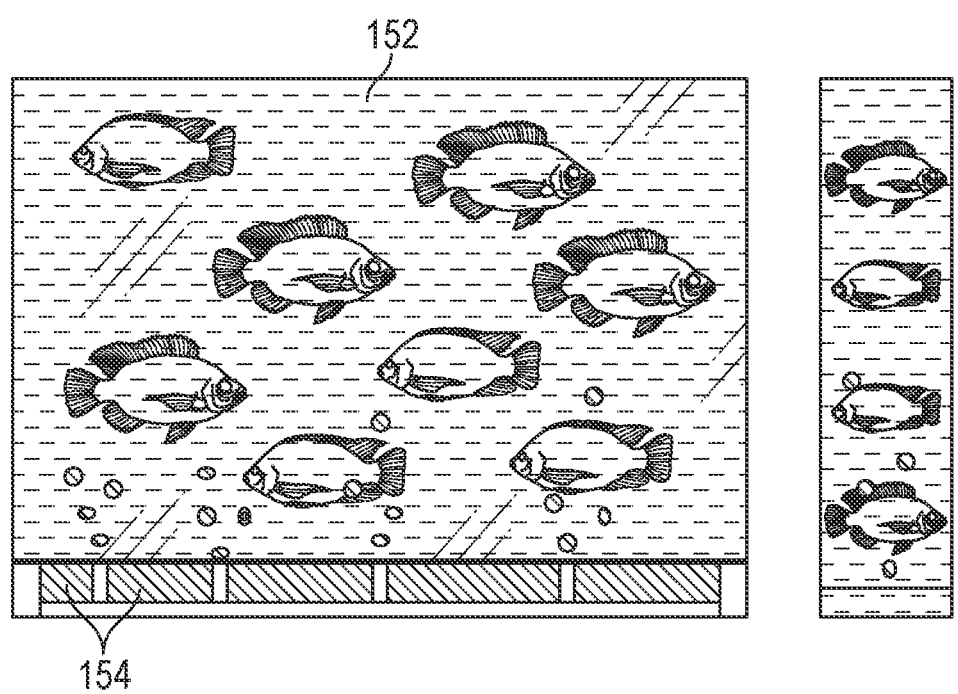
FIG. 16 shows front and side views of the aquaculture board of the V-hive Aquaponics Green Box cultivation system.

In one embodiment, as shown in FIG. 16, each aquaculture board (150) may comprise a rigid tank (152) configured to hold fluids. Preferably, the rigid tank (152) is constructed from a substantially transparent or non-transparent rigid material, such as a glass, polyvinyl chloride, polyethylene, or polycarbonate material. In another embodiment, the aquaculture board (150) may also comprise a sliding mechanism (160) (e.g. wheels, ball bearings, and the like) disposed thereon and configured to slide along the top and bottom tracks (120, 130), thereby allowing for the aquaculture board (150) to slidably move in the first direction. Each bottom track may further comprise a removable extension track (136) configured to be connected to the bottom track. The extension track (136) can allow for the aquaculture board (150) to slidably move beyond the frame structure (110).

In some embodiments, the V-hive aquaculture green box (105) may further comprise one or more pumps operatively (176) connected to the aquaculture boards (150) for circulating the fluids to and from, and within the rigid tank (152). In other embodiments, the aquaculture board (150) may further comprise one or more air spargers (154) operatively connected to the rigid tank (152) for aerating the water. In still other embodiments, as shown in FIG. 15B, the V-hive aquaculture green box (105) may further comprise one or more light sources (148) for providing lighting to the aquatic animals or aquatic plants. Examples of light sources (148) include, but are not limited to, light emitting diodes (LEDs), fluorescent tubes, ultra-violet light, or a combination thereof. In further embodiments, the system may comprise an exterior casing (107), such as a shipping container, for housing the V-hive aquaculture green box.

In some embodiments, any of the systems described herein may utilize alternative energy sources to power the electrical components of the system. For example, the light sources, pumps, and digital components may be powered by solar or wind energy solely, or in combination with power from the power grid. This may further reduce the energy usage and cost of Vertical Farming. In alternative embodiments, the fluids from the aquaculture boards may be used to fertilize the growing boards. For instance, when used aquaculture fluid, which contains nutrient-rich fish emulsions, is renewed with fresh water, the used aquaculture fluid may be stored in the reservoir (170) for future use to water and fertilize the crops. This may also further reduce the water and fertilizer usage and costs of Vertical Farming.

Without wishing to limit the invention to a particular theory or mechanism, the modularity of the system provides significant convenience in installation and removal of the growing system within the modular Vertical Farm. It also provides significant convenience in the scale up of production through the addition or removal of modular units. Further still, the orthogonal and lateral movements of the G-Boards, L-Boards, and A-boards, as well as the relative movements of the growing trays/tubes on the G-Board and the light sources on the L-Board, lend themselves conveniently to automation and remote control. The V-Hive Green Box design also makes its crop cultivation protocols in terms of lighting, nutrient delivery and overall optimization amenable to automation and remote control.

EXAMPLE

The following is a non-limiting example of the present invention. Equivalents or substitutes are within the scope of the invention.

Case Study: Arizona Cats in the Greenbox

Southern Arizona has a number of areas that can be categorized as "food deserts." The U.S. Department of Agriculture defines food deserts as areas of the country that are lacking or devoid "of fresh fruit, vegetables, and other healthful whole foods, usually found in impoverished areas. This is largely due to a lack of grocery stores, farmers' markets, and healthy food providers."

As a solution to mitigate the food insecurity in food-desert neighborhoods and regions in Southern Arizona, the Arizona Cats in the Greenbox project has been established to design and implement sustainable intensive production of high-value crops (e.g., lettuce and microgreens) in movable, used shipping containers, each named the Arizona Green Box, in accordance with the principles of the Vertical Green Box Solution. The Arizona Green Box, which are modular and movable shipping-container hydroponic boxes, can constitute an innovative, practical and cost-competitive strategy to grow and deliver fresh vegetables to food deserts, especially given that conventional greenhouses remain costly to build. They can also serve as effective focal-point activity for such areas that could foster community cohesion and building.

Without wishing to limit the invention to a particular theory or mechanism, a standard-sized shipping container provides the following significant advantages in implementing movable and modular controlled-environment hydroponic boxes: 1) Economical—about $2,000 or less per unit; 2) Easily procured; 3) Movable and easily transported, whereas a greenhouse building is typically fixed in location; 4) Modular with standard size, thus, the configuration and arrangement of hydroponic cultivation systems inside a unit can be customized, optimized and standardized to be identical for all other units; 5) Scalable—the modularity of the unit lends itself to convenient scalability through simple unit multiplication; 6) Convenient control of physical environment on account of the modularity of the unit; 7) Can be stacked vertically one on top of the other if needed to save land area; and 8) Easily secured.

The Arizona Green Box is a sustainable, movable and modular method of controlled-environment hydroponics crop production that can save as much as 80 percent of water compared with conventional farm production and supplies renewable power to its crop lighting system using solar photovoltaic (PV) panels. Because it is movable and modular, shipping-container controlled-environment crop production, such as the Arizona Green Box, lends itself readily to applications including emergency food aid during famine or for natural disaster relief.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A modular cultivation system (100) comprising a vertical hive (V-Hive) green box (105) comprising:
    a. a frame structure (110) comprising a top frame (111) having two parallel top rails (112*a*, 112*b*), and a bottom frame (115) having two parallel bottom rails (116*a*, 116*b*), wherein the top rails (112*a*, 112*b*) are parallel to the bottom rails (116*a*, 116*b*);
    b. a plurality of top tracks (120), each top track (120) having a first top track end (122) connected to one of the top rails (112*a*) and a second top track end (124) connected to the other top rail (112*b*) such that each top track (120) is perpendicular to the top rails and parallel to each other;
    c. a plurality of bottom tracks (130), each bottom track (130) having a first bottom track end (132) connected to one of the bottom rails (116*a*) and a second bottom track end (134) connected to the other bottom rail (116*b*) such that each bottom track (130) is perpendicular to the bottom rails and parallel to each other, wherein each bottom track (130) has a corresponding top track (120) that is parallel to and directly opposite of said bottom track (130); and
    d. a plurality of cultivation boards (140), each cultivation board (140) disposed between one of the bottom tracks and its corresponding top track, wherein each cultivation board (140) is supported by one of the bottom tracks and its corresponding top track, wherein each cultivation board (140) is slidably movable along the top and bottom tracks (120, 130) in a first direction orthogonal to the top and bottom rails (112, 116); and wherein each of the top and bottom tracks (120, 130) is configured to act as a guide for movement of at least one of the plurality of cultivation boards along said track, and wherein the top and bottom tracks (120, 130) are slidably movable along the top and bottom rails (112, 116) in a second direction parallel to the top and bottom rails and perpendicular to a length of each track, thereby allowing for movement of the cultivation boards (140) in the second direction;
    e. wherein the cultivation boards (140) are growing boards (142), lighting boards (146), or aquaculture boards (150).

2. The system (100) of claim 1, wherein each growing board (142) comprises a plurality of growing trays (144) attached to said growing board (142), wherein the growing trays (144) are configured to contain crops.

3. The system (100) of claim 2, wherein the growing trays (144) are oriented vertically or horizontally on the growing board (142).

4. The system (100) of claim 2, wherein the growing trays (144) are disposed parallel to each other.

5. The system (100) of claim 1, wherein each lighting board (146) comprises a plurality of light sources (148) attached to said lighting board (146), wherein the light sources (148) are configured to provide lighting to crops.

6. The system (100) of claim 5, wherein the light sources (148) are oriented vertically or horizontally on the lighting board (146).

7. The system (100) of claim 5, wherein the light sources (148) are disposed parallel to each other.

8. The system (100) of claim 5, wherein the light sources (148) comprise light emitting diodes (LEDs), fluorescent tubes, or a combination thereof.

9. The system (100) of claim 1, wherein each aquaculture board (150) comprises a rigid tank (152) configured to hold fluids.

10. The system (100) of claim 9, wherein the aquaculture boards (150) are configured for raising aquatic animals, aquatic plants, or a combination thereof.

11. The system (100) of claim 1, wherein each cultivation board (140) further comprises a sliding mechanism (160) disposed thereon and configured to slide along the top and bottom tracks (120, 130), thereby allowing for the cultivation board (140) to slidably move in the first direction.

12. The system (100) of claim 1, wherein a sliding mechanism (160) is disposed on each of the top track ends (122, 124) and each of the bottom track ends (132, 134), wherein the sliding mechanism (160) enables the top and bottom tracks (120, 130) to slidably move along the top and bottom rails (112, 116), respectively, in the second direction, thereby allowing the cultivation boards to move in two orthogonal directions.

13. The system (100) of claim 11 or 12, wherein the sliding mechanism (160) comprises wheels, ball bearings, or sliding brackets.

14. The system (100) of claim 1, wherein the frame structure further comprises a side frame (118) connecting the top frame (111) to the bottom frame (115), thereby forming frame structure (110) into a box frame.

15. The system (100) of claim 1, wherein each bottom track (130) further comprises an extension track (136) configured to be connected to the bottom track (130), wherein the extension track (136) allows for the cultivation board (140) to slidably move beyond the frame structure (110).

16. The system (100) of claim 1 further comprising an exterior casing (107) for housing the V-hive green box (105).

17. The system (100) of claim 16, wherein said exterior casing (107) is a shipping container.

18. A modular cultivation system (100) comprising a vertical hive (V-Hive) green box (105) comprising:
   a. a frame structure (110) comprising a top frame (111) having two parallel top rails (112a, 112b), and a bottom frame (115) having two parallel bottom rails (116a, 116b), wherein the top rails (112a, 112b) are parallel to the bottom rails (116a, 116b);
   b. a plurality of top tracks (120), each top track (120) having a first top track end (122) connected to one of the top rails (112a) and a second top track end (124) connected to the other top rail (112b) such that each top track (120) is perpendicular to the top rails and parallel to each other;
   c. a plurality of bottom tracks (130), each bottom track (130) having a first bottom track end (132) connected to one of the bottom rails (116a) and a second bottom track end (134) connected to the other bottom rail (116b) such that each bottom track (130) is perpendicular to the bottom rails and parallel to each other, wherein each bottom track (130) has a corresponding top track (120) that is parallel to and directly opposite of said bottom track (130);
   d. a plurality of growing boards (142), each growing board (142) disposed between one of the bottom tracks and its corresponding top track, wherein each growing board (142) is supported by and guided along one of the bottom tracks and its corresponding top track, wherein each growing board (142) comprises a plurality of growing trays (144) attached to said growing board (142), wherein the growing trays (144) are configured to contain crops; and
   e. a plurality of lighting boards (146), each lighting board (146) disposed between one of the bottom tracks and its corresponding top track, wherein each lighting board (146) comprises a plurality of light sources (148) attached to said lighting board (146), wherein the light sources (148) are configured to provide lighting to the crops;
   wherein the growing boards (142) and the lighting boards (146) are slidably movable along the top and bottom tracks (120, 130) in a first direction orthogonal to the top and bottom rails (112, 116), and
   wherein the top and bottom tracks (120, 130) are slidably movable along the top and bottom rails (112, 116) in a second direction parallel to the top and bottom rails and perpendicular to a length of each track, thereby allowing for movement of the growing boards (142) and the lighting boards (146) in the second direction.

19. A modular cultivation system (100) comprising a vertical hive (V-Hive) aquaculture green box (105) comprising:
   a. a frame structure (110) comprising a top frame (111) having two parallel top rails (112a, 112b), and a bottom frame (115) having two parallel bottom rails (116a, 116b), wherein the top rails (112a, 112b) are parallel to the bottom rails (116a, 116b);
   b. a plurality of top tracks (120), each top track (120) having a first top track end (122) connected to one of the top rails (112a) and a second top track end (124) connected to the other top rail (112b) such that each top track (120) is perpendicular to the top rails and parallel to each other;
   c. a plurality of bottom tracks (130), each bottom track (130) having a first bottom track end (132) connected to one of the bottom rails (116a) and a second bottom track end (134) connected to the other bottom rail (116b) such that each bottom track (130) is perpendicular to the bottom rails and parallel to each other, wherein each bottom track (130) has a corresponding top track (120) that is parallel to and directly opposite of said bottom track (130); and
   d. a plurality of aquaculture boards (150) configured for raising aquatic animals, aquatic plants, or a combination thereof, each aquaculture board (150) comprising a rigid tank (152) configured to hold fluids, wherein each aquaculture board (150) is disposed between one of the bottom tracks and its corresponding top track;
   wherein the aquaculture boards (150) are slidably movable along the top and bottom tracks (120, 130) in a first direction orthogonal to the top and bottom rails (112, 116),
   wherein each of the top and bottom tracks (120, 130) is configured to act as a guide for movement of at least one of the plurality of cultivation boards along said track, and wherein the top and bottom tracks (120, 130) are slidably movable along the top and bottom rails (112, 116) in a second direction parallel to the top and bottom rails, thereby allowing for movement of the aquaculture boards (150) and in the second direction.

* * * * *